Nov. 26, 1974 R. J. ALBRECHT ET AL 3,851,088
METHOD FOR LAMINATING SHEET DOUGH
Filed Oct. 24, 1972
3 Sheets-Sheet 3
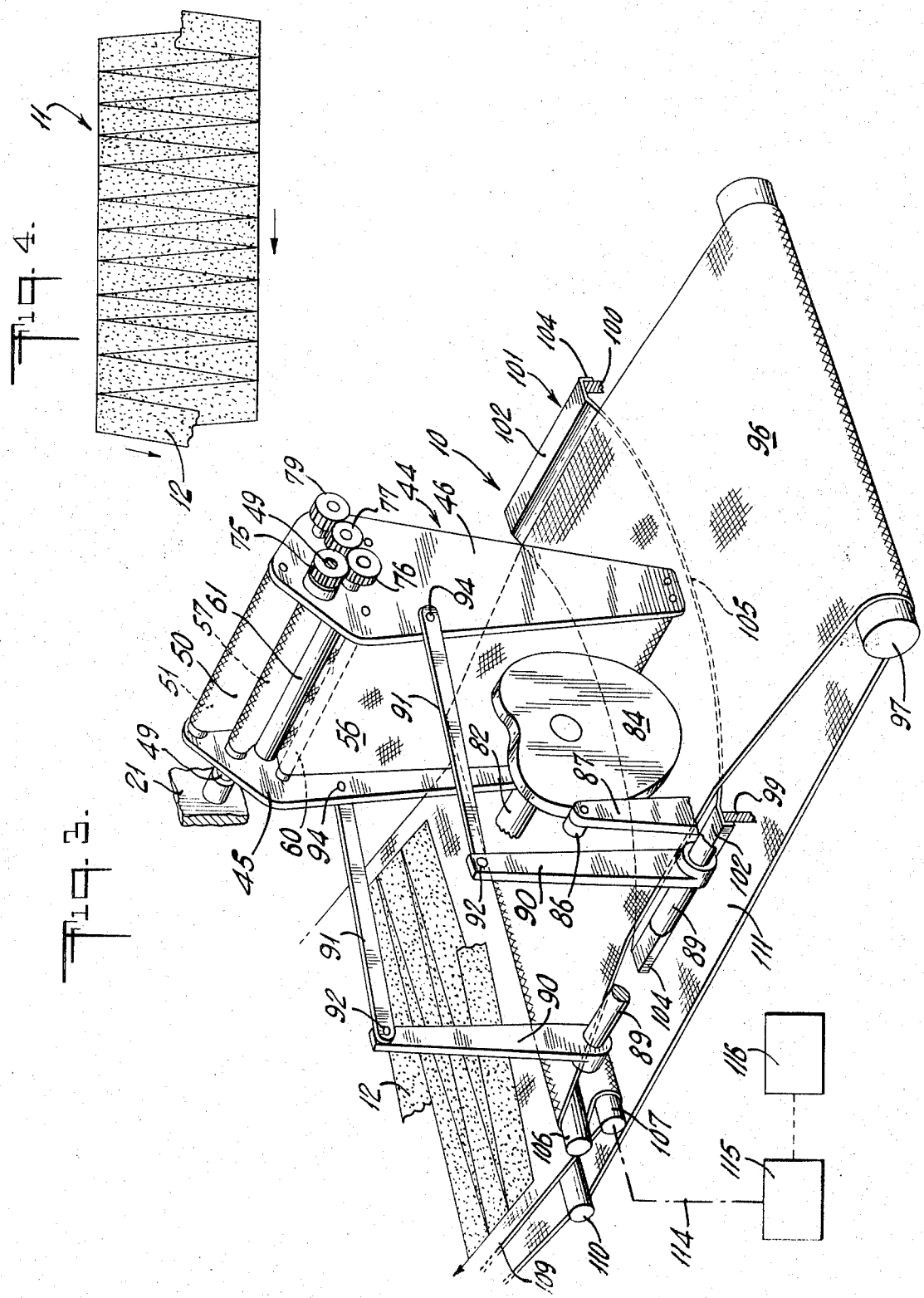

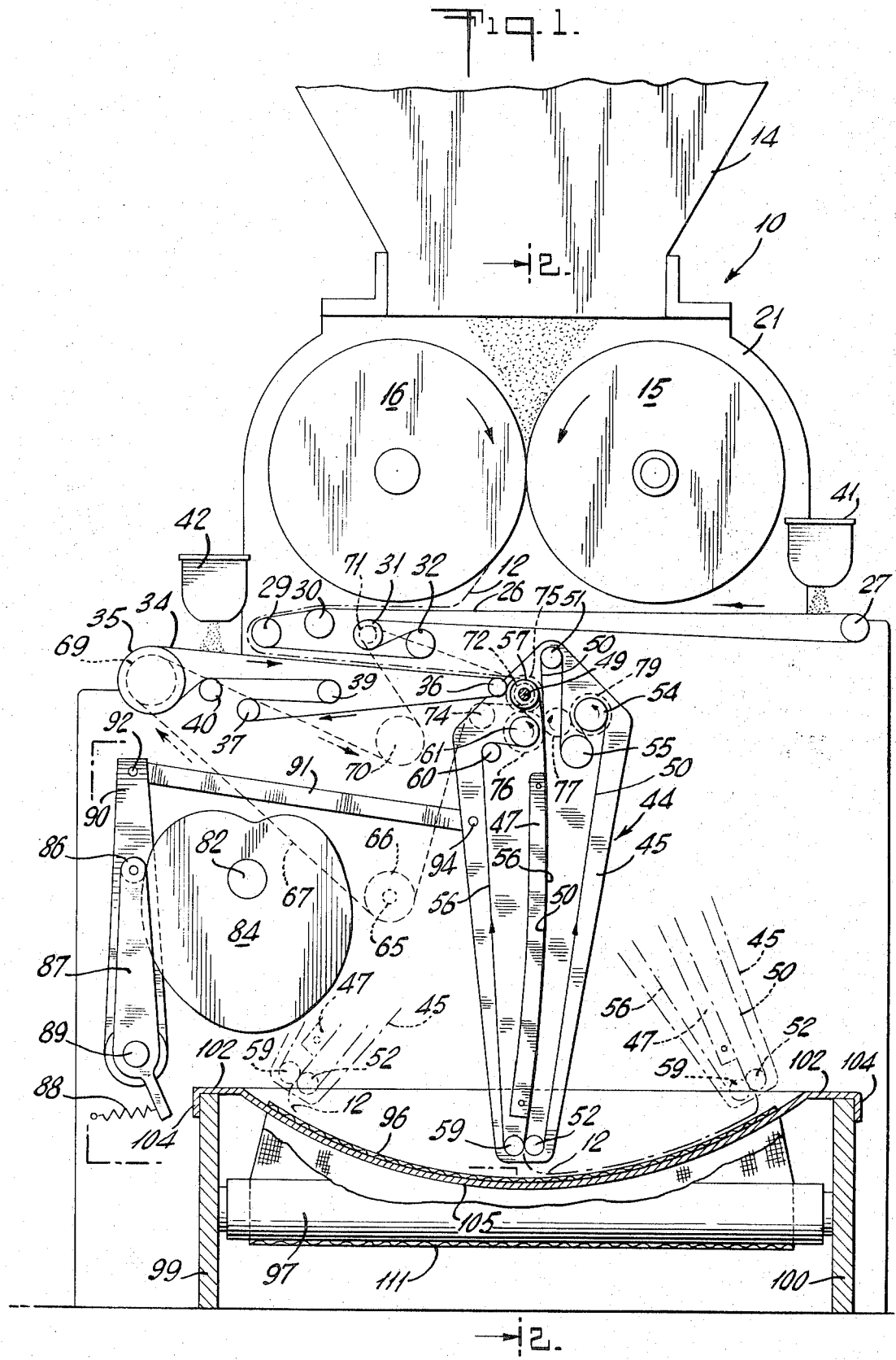

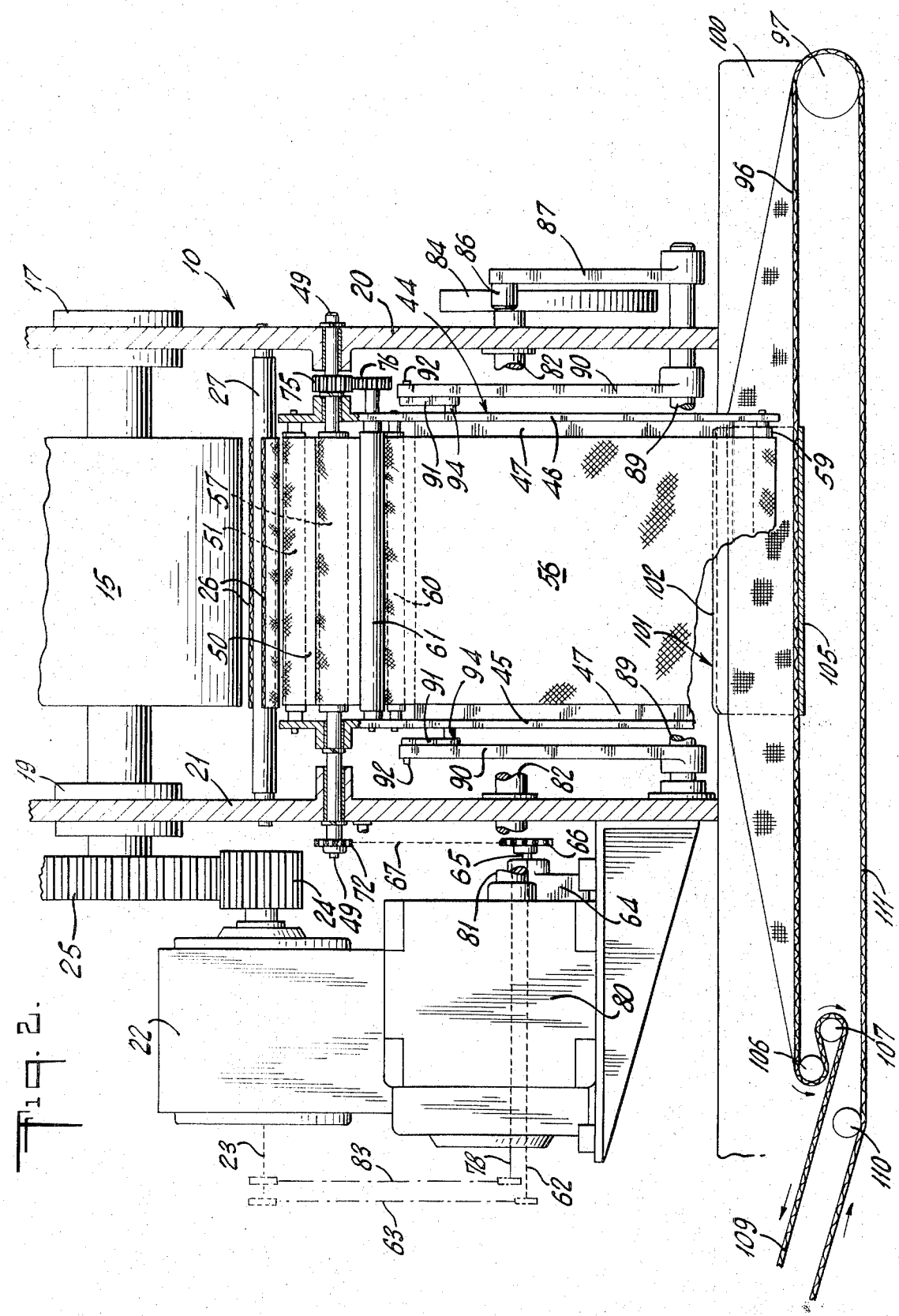

United States Patent Office 3,851,088
Patented Nov. 26, 1974

3,851,088
METHOD FOR LAMINATING SHEET DOUGH
Robert J. Albrecht, River Edge, and Alexander J. Stanley, Militown, N.J., assignors to Nabisco, Inc., New York, N.Y.
Filed Oct. 24, 1972, Ser. No. 300,386
Int. Cl. A21d 6/00
U.S. Cl. 426—502                    6 Claims

ABSTRACT OF THE DISCLOSURE

Method for laminating a sheet of dough upon an endless conveyor having an active horizontal run and being driven forwardly at a constant speed. The active run of the conveyor is formed into an upwardly concave channel which has an upper surface which is in the form of a part of a cylinder at a laminating station. A sheet of dough is fed along guide means disposed in a plane lying radially of the channel toward the upper surface of the concave part of the conveyor, said guide means terminating close to the concave upper surface of the conveyor. The guide means and thus the radial axial path of feeding of the dough sheet are oscillated about the longitudinal axis of the channel, the speed of travel of the conveyor and the frequency of oscillation of the radial path of travel of the dough being correlated to produce a predetermined desired degree of overlap of successive angularly disposed laps of dough sheet on the conveyor.

---

This invention relates to a method of and an apparatus for laminating sheet dough. Such lamination, which is old in the art, is carried out, for example, in the making of baked products such as crackers in order to produce a flaky structure therein.

Typical prior art laminators of the pendulum type feed sheet dough through a guide means disposed longitudinally of the pendulum, the pendulum oscillating transversely of the length of a flat belt conveyor running therebeneath. The speed of travel of the conveyor and the frequency of oscillation from the pendulum are so correlated as to produce a predetermined desired degree of overlap between successive laps of the sheet dough, such laps extending successively at equal opposite angles transversely to the path of travel of the conveyor. Because the outer, discharge end of the guide means at the end of the pendulum swings in an arc, and because the upper surface of the conveyor upon which the sheet dough is deposited lies in a plane, the dough must travel different distances from the point of discharge thereof from the guide means on the pendulum to the surface of the conveyor. This leads to non-uniformity in the deposited laminated sheet dough, and sometimes even to tearing thereof.

Attempts have been made to overcome these difficulties, while maintaining the conveyor, as before, in flat condition as it passes through the laminating station. In one such prior apparatus, the pendulum is made in such manner that its length is selectively increased and decreased, the length of the pendulum being at a minimum when it lies transversely centrally over the conveyor and at a maximum when it lies in either of its outer angularly extreme positions during its oscillation; such arrangement maintains the distance between the discharge end of the guide means on the pendulum and the upper surface of the conveyor substantially a constant throughout the oscillation of the pendulum. Not only is the mechanism for thus altering the length of the pendulum during its oscillation complicated and thus prone to operating difficulties, but the periodic lengthening and shortening of the dough sheet guide means of the pendulum periodically attenuates the dough sheet and thus leads to non-uniformities therein as it is laid down upon the conveyor.

The method of and apparatus of the present invention overcome the above-outlined difficulties experienced in the prior art. In accordance with the invention there is employed a dough sheet-receiving and supporting surface at the laminating station, the surface being of such configuration as to lie a constant distance from the outer end of a dough sheet-depositing pendulum of constant length. Specifically, the pendulum is mounted for oscillation about a fixed axis, and the dough sheet-receiving and supporting surface is of part-circular cylindrical shape with its axis coaxial with the axis of oscillation of the pendulum. In the illustrative embodiment, the dough sheet-receiving and supporting surface is formed on an upper, active run of a belt conveyor, the belt being transversely bendable, such run being bent from a flat condition in advance of the laminating station into said part-circular cylindrical configuration thereof at the laminating station. As they leave the laminating station, the belt and the laminated dough sheet deposited thereon are bent so as to lie flat in a transverse direction, the transversely flat laminated dough sheet being delivered in that condition to subsequent dough-feeding apparatus such as sheeting rolls, which are not a part of this invention.

The above and further objects and novel features of the invention will more fully appear from the following description when the same is read in connection with the accompanying drawings. It is to be understood, however, the drawings are for the purpose of illustration only, and are not intended as a definition of the limits of the invention.

In the drawings, wherein like reference characters refer to like parts throughout the several views:

FIG. 1 is a fragmentary, somewhat simplified, view in transverse section through the illustrative embodiment of dough sheet laminator of the invention;

FIG. 2 is a view in longitudinal section through such apparatus, the section being taken along the broken section line 2—2 of FIG. 1;

FIG. 3 is a somewhat simplified schematic view in perspective of the laminator of FIGS. 1 and 2; and FIG. 4 is a fragmentary schematic view in plan of a laminated dough sheet made by the method and apparatus of the present invention.

In FIGS. 1, 2, and 3, the pendulum dough sheet laminating mechanism of the invention is generally designated by the reference character 10. Such laminator produces a product 11 (FIG. 4) in which a dough sheet 12 of single thickness has been overlapped in successive folds. In FIG. 4, the folded dough structure has been simplified for ease of illustration; in a typical cracker-making operation, for example, the laminated dough sheet formed by the further sheeting of the structure 11 will, in general, contain four superimposed dough sheet layers.

Turning now to FIG. 1, there is there shown a dough hopper 14 beneath which there is disposed a dough sheeting station containing two opposed parallel circular cylindrical dough sheeting rolls 15 and 16 which are driven in opposite directions as indicated. Each of the rolls 15, 16 is journalled in the frame of the apparatus, in FIG. 2 the shaft upon which roll 15 is mounted being shown journalled in bearings 17 and 19 in spaced vertical parallel frame-forming plate members 20, 21, respectively.

The rolls 15, 16 are driven by a variable-speed motor 22 through the medium of a pinion 24 on the motor shaft and gearing including the gear 25 shown in FIG. 2 meshing with pinion 24. Means (not shown) are provided to adjust the axis of one of the rolls 15, 16 relative to the other so as to present a space therebetween at the nip thereof such as to produce a dough sheet 12 of the desired thickness. Such sheet 12 passes downwardly from between the roll nip, is flour-coated on both sides by flour from flour boxes 41, 42, and is then delivered to a dough sheet guide and feeding means within an oscillating pendulum 44 which then deposits it upon the longitudinally travelling conveyor belt 96 of the laminator.

Upon passing downwardly from the nip between the sheeting rolls 15, 16, the dough sheet 12 is deposited upon a first, transversely travelling belt conveyor 26 which is entrained over a first, right-hand roller 27 and a second, left-hand roller 29 (FIG. 1). A belt-tightening and supporting roller 30 is provided immediately upstream of the roller 29. The conveyor 26 is driven by being passed partially around a pair of S-rollers 31, 32, roller 31 being driven in a manner to be described. The upper run of conveyor 26 is continuously provided with a layer of flour from the flour box 41, disposed above the right-hand end of the upper run of the conveyor 26. The dough sheet 12 thus has flour applied to the under surface threof as it lies on the conveyor 26.

After passing over the roller 29, the belt of conveyor 26 deposits the dough sheet 12 upon the upper run of a second, lower horizontal belt conveyor 34. The belt of such second conveyor is entrained over a first, left-hand roller 35 and a second, right-hand roller 36 (FIG. 1), roller 36 lying substantially midway of the length of the conveyor 26. The belt of conveyor 34 passes over a belt-supporting and tightening roller 40 immediately upstream of the roller 35, and partially about two S-rollers 37, 39, as shown. The left-hand end of the conveyor 34 extends outwardly beyond the roller 29 of the first conveyor 26, whereby flour may be deposited upon the upper surface of the belt of conveyor 34 from the second flour box 42, which lies about the left-hand end of conveyor 34. As the dough sheet 12 is deposited upon the upper run of conveyor 34, the then lower surface of the dough sheet is coated with flour which has been deposited upon the conveyor 34.

The dough sheet laminator includes a pendulum generally designated 44 having a left side frame member 45 and a right side frame member 46 (FIG. 3) the two spaced parallel frame members 45, 46 being connected by threaded rods and held spaced and parallel by spacer sleeves, as shown. A curved platen 47 extends between the side frame members 45, 46 generally lengthwise of the pendulum and supplies a backing for the two opposed runs of further belt conveyors, to be described, disposed within the pendulum generally lengthwise thereof. The pendulum 44 is mounted for oscillation about a horizontal pivot shaft 49 which runs through the top of the pendulum and is supported in the opposed side frame members 20, 21 of the laminator.

As shown most clearly in FIG. 1, there is a first, right-hand vertical conveyor belt 50 in the pendulum 44, and there is also a second, left-hand vertical conveyor belt 56 therein, the belts of the two conveyors being driven at the same surface speed and cooperating in the parallel generally vertical runs thereof to guide and feed a dough sheet 12 therebetween and finally out of the outer lower end of the pendulum 44 as it oscillates, whereby to deposit such dough sheet 12 upon the longitudinally travelling conveyor 96.

The first generally vertical conveyor 50 in the pendulum 44 is provided with a roller 51 at the top and with a roller 52 at the bottom, the belt of such conveyor being entrained over rollers 51, 52. Such belt is driven by a pair of S-rollers 54, 55 one of which is driven in a manner to be described.

The second generally vertical conveyor 56 in the pendulum 44 is provided with an upper roller 57 mounted upon the shaft 49, a lower roller 59, the belt of such conveyor being entrained over such two rollers 57, 59. The rollers 52, 59 at the bottom of the two opposed belt conveyors 50, 56, are disposed adjacent the bottom lower end of the pendulum, the nip between the opposed belts of the conveyor lying slightly to the left (FIG. 1) of the lower bottom edge of the platen 47. The upper rollers 51, 57 of the opposed vertical belt conveyors 50, 56 are so disposed that the two opposed runs of the vertical conveyors approach the upper right-handcorner of the curved platen 47 in a direction somewhat from the left, so that such two opposed runs of the conveyor belts and the dough sheet 12 confined therebetween faithfully follow the right-hand, convex surface of the platen 47. The belt of conveyor 56 passes partially around a belt-diverting and tightening roller 60 and thence partially around a roller 61 and the roller 57, the latter two rollers functioning as S-rollers.

The conveyors 50 and 56 are driven by the motor 22 in the following manner: A "Timing" belt schematically indicated at 63 in FIG. 1 is entrained over sprockets on the motor shaft 23 and an input shaft 62 of a PIV gearing mechanism 64. Mechanism 64 has an output shaft 65 upon which there is affixed a driving sprocket 66. As shown in FIG. 1, a chain 67 is entrained over the sprocket 66, a sprocket 69 affixed to the roller 35, an idle sprocket 70, a sprocket 71 affixed to the S-roller 31, and a sprocket 72 affixed to the S-roller 57. It will thus be apparent that rotation of the shaft 65 will drive conveyors 26 and 34 at a speed dictated by the adjustment of the PIV mechanism 64.

The two vertical conveyors 50 and 56 within the pendulum 44 are driven by the chain 67 in the following manner: As shown in FIGS. 1 and 3, there is a pinion 75 rotatably mounted on the shaft 49 and affixed to the roller 57. Pinion 75 meshes with a gear 76 affixed to the shaft upon which the roller 61 is affixed. An idle gear 77 meshes with gear 76, and a gear 79 affixed to the roller 54 meshes with gear 77. It will thus be apparent that the driving of the gear 75 by the chain 67 drives conveyors 50 and 56 at the same speed, and with their opposing active vertical runs travelling downwardly.

The pendulum 44 is oscillated by the motor 22 driving through a second PIV mechanism 80. As schematically shown in FIG. 2, a "Timing" belt 83 is entrained over a sprocket on shaft 23 of motor 22 and a sprocket on the input shaft 78 of the PIV 80. Mechanism 80 has an output drive shaft 81 which is drivingly connected to a longitudinally extending cam shaft 82 journalled in the frame members 20, 21 as shown in FIG. 2. On the right-hand end of shaft 82 there is affixed a cam 84, with which there cooperates a cam follower roll 86. Roll 86 is rotatably mounted on the upper outer end of a lever 87 affixed to a longitudinally extending rock shaft 89 journalled in the side frame members 20, 21. The cam follower roll 86 is constantly maintained in contact with the cam 84 by a coil tension spring 88 acting between fixed frame structure and an extension of lever arm 87 below shaft 89, as shown in FIG. 1. Also affixed to the rock shaft 89 are two similar longitudinally spaced rock levers 90 which are disposed outwardly beyond the respective sides of a pendulum 44, the ends of the levers 90 being connected to the respective side frame members 45, 46 of the pendulum 44 by links 91 which are pivotally connected to the levers 90 and the side frame members of the pendulum 44, respectively, by pivot pins 92, 94.

At the laminator there is a longitudinally extending dough sheet-receiving conveyor disposed laterally symmetrically beneath the pendulum 44, such conveyor being a generally horizontal endless belt conveyor having a flexible belt 96. The upper, active run of the conveyor belt 96 travels in a direction from right to left in FIG. 2. The belt 96 is entrained at the rear (right) over a circular cylindrical roller 97 and forwardly of the laminating station (at the left) over circular cylindrical S-rollers 106, 107. The rollers 97 and 106, 107 are journalled in spaced vertical parallel longitudinally extending side frame members 99, 100. Mounted upon the side frame members 99, 100 vertically beneath the pendulum 44 and having a longitudinal dimension slightly exceeding the longitudinal dimension of the pendulum there is an apron 101 which supports and shapes the upper run of the belt 96 as the latter runs thereover. Apron 101 has a central portion 105 of part-circular cylindrical shape, part 105 having its axis of rotation coincident with the axis of pivot shaft 49 upon which the pendulum 44 is mounted. The apron 101 has straight side portions 102 which overlie the upper edges of the side frame members 99, 100. Flanges 104 on the side edges of the apron maintain the apron laterally centered. Means (not shown) retain the apron 101 in its longitudinal position upon members 99, 100.

It will be apparent as the upper active run of the belt 96 travels to the left (FIG. 2) toward the apron 101, such upper run of the belt is gradually bent so that when it reaches the apron it conforms in shape thereto as shown in FIG. 1. The portion of the conveyor belt 96 confronting the lower, outer end of the pendulum 44 is thus of part-circular cylindrical shape and lies equidistant from the outer end of the pendulum at all points upon which the dough sheet 12 is deposited. After leaving the apron 101, the belt 96 gradually straightens so that it, and the laminated or lapped dough sheet 12 supported thereon, become flat by the time the upper active run of the conveyor belt has reached the first S-roller 106. At the location of such roller 106 the now flat laminated dough sheet is, in effect, peeled from the conveyor 96 at the zone thereof running over the roller 106; the dough sheet 12 is deposited upon the further flat run of the conveyor 96 downstream of the second S-roller 107. Such further run of the belt, designated 109, extends to further dough sheet processing means, not a part of this invention. Upon its return, the conveyor belt 96 runs under a roller 110 in a lower run 111 thereof and returns to the rear roller 97.

The conveyor belt 96 is driven at a speed properly correlated with the frequency of oscillation of the pendulum 44 through mechanism schematically shown in FIG. 3. There such driving means takes the form of a PIV gearing mechanism 115 having an output shaft 114 connected to the S-roller 107. Mechanism 115 is driven by a motor 116. It is to be understood that, if desired, the driving of the conveyor 96 may be effected by the motor 22 through the medium of suitable speed-changing mechanism, rather than by a separate driving motor 116 as shown.

Although the accompanying drawings and foregoing specification describe a single preferred embodiment of the invention, it is to be especially understood that various changes, such as in the relative dimensions of the parts, materials used, and the like, as well as the suggested manner of use of the apparatus of the invention, may be made without departing from the spirit and scope of the invention, as will now be apparent to those skilled in the art.

What is claimed is:

1. The method of laminating a sheet of dough upon a supporting surface, which comprises providing the supporting surface with an upwardly concave channel at a laminating station, the longitudinal axis of the channel being parallel to the length of the supporting surface, feeding a sheet of dough along guide means disposed in a plane lying radially and axially of the channel toward the upper surface of the concave part of the supporting surface, oscillating said guide means and thus the dough sheet being fed along said radial axial path about the longitudiinal axis of the channel, laying the dough sheet as it leaves the guide means into the upwardly concave channel and bending it into conformity therewith, longitudinally displacing the supporting surface and the guide means relative to each other, and correlating the speed of longitudinal displacement between the supporting surface and the guide means and the frequency of oscillation of the radial path of travel of the dough sheet to produce a predetermined desired degree of overlap of successive angularly disposed upwardly concave laps of dough sheet on the supporting surface at the laminating station.

2. The method according to claim 1, wherein the supporting surface is part of an endless conveyor having an active generally horizontal run, and the conveyor is driven forwardly, which comprises forming the active run of the conveyor into said upwardly concave channel which has an upper surface in the form of a part of a circular cylinder at the laminating station, said axis being parallel to the direction of travel of the active run of the conveyor.

3. The method according to claim 2, wherein the conveyor is driven at a constant speed.

4. The method according to claim 2, wherein the guide means terminates close to the concave upper surface of the conveyor.

5. The method according to claim 2, wherein the channel is symmetrical laterally of the conveyor and is substantially in the shape of part of a circular cylinder.

6. The method according to claim 2, wherein the conveyor is a belt conveyor, and the belt is flexible transversely of the length thereof, and comprising bending the belt transversely from a transversely flat condition downstream of the laminating station to form said channel as it approaches the laminating station, holding the belt in said channel shape at the laminating station, and, after the belt and laminated dough sheet product leave the laminating station, bending the belt and laminated dough sheet product thereon into a transversely flat condition.

References Cited
UNITED STATES PATENTS

| | | | |
|---|---|---|---|
| 1,545,689 | 7/1925 | Peters | 426—502 |
| 1,975,326 | 10/1934 | Loose et al. | 426—502 X |

RAYMOND N. JONES, Primary Examiner

U.S. Cl. X.R.

99—450.1